US009983291B2

(12) United States Patent
Do et al.

(10) Patent No.: US 9,983,291 B2
(45) Date of Patent: May 29, 2018

(54) METHODS, APPARATUSES, AND DEVICES FOR MOBILE DEVICE POSITION ESTIMATION USING VIRTUAL ACCESS POINTS

(71) Applicant: QUALCOMM Incorporated, San Diego, CA (US)

(72) Inventors: Ju-Yong Do, Palo Alto, CA (US); Sai Pradeep Venkatraman, Santa Clara, CA (US); Sundar Raman, Fremont, CA (US); Weiyi Liu, Sunnyvale, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 734 days.

(21) Appl. No.: 14/537,747

(22) Filed: Nov. 10, 2014

(65) Prior Publication Data

US 2016/0131733 A1    May 12, 2016

(51) Int. Cl.
| | |
|---|---|
| H04W 4/00 | (2018.01) |
| G01S 5/00 | (2006.01) |
| G01S 5/02 | (2010.01) |

(52) U.S. Cl.
CPC .......... *G01S 5/0063* (2013.01); *G01S 5/0226* (2013.01); *G01S 5/0236* (2013.01)

(58) Field of Classification Search
CPC ..... G01S 5/0063; G01S 5/0226; G01S 5/0236
USPC ...................................................... 455/453.1
See application file for complete search history.

(56) References Cited

U.S. PATENT DOCUMENTS

| | | |
|---|---|---|
| 6,259,898 B1 | 7/2001 | Lewis |
| 7,509,131 B2 | 3/2009 | Krumm et al. |
| 7,613,142 B2 | 11/2009 | Molteni et al. |
| 7,633,909 B1 | 12/2009 | Jones et al. |
| 8,140,094 B2 | 3/2012 | Morgan et al. |
| 8,150,367 B1 | 4/2012 | Malladi et al. |
| 8,314,736 B2 | 11/2012 | Moshfeghi |

(Continued)

FOREIGN PATENT DOCUMENTS

| | | |
|---|---|---|
| KR | 20120029976 A | 3/2012 |
| WO | WO-2013022213 A1 | 2/2013 |
| WO | WO-2014150724 A1 | 9/2014 |

OTHER PUBLICATIONS

Aboba B., "Virtual Access Points", IEEE P802.11 Wireless LANS, XX, XX, No. 802.11-03/154r1, May 22, 2003 (May 22, 2003), pp. 1-13, XP002425027.

(Continued)

*Primary Examiner* — Charles Shedrick
(74) *Attorney, Agent, or Firm* — Berkeley Law & Technology Group, LLP

(57) ABSTRACT

Methods, apparatuses, and devices are disclosed to estimate a position of a mobile device using, for example, beacon signals transmitted using virtual access points utilizing a single, physical transceiver. Determination that beacon signals emanate from a single, physical transceiver may be based, at least in part, on a similarity among acquired beacon signals conveying identifiers, such as media access control identification (MAC ID) addresses and/or basic service set identifiers (BSSIDs), and on measurement of beacon signal characteristics, such as received signal strength at a mobile device and/or round trip time between the mobile device and the transceiver.

26 Claims, 8 Drawing Sheets

(56) References Cited

U.S. PATENT DOCUMENTS

| | | | |
|---|---|---|---|
| 8,638,717 | B2 | 1/2014 | Chen et al. |
| 8,989,101 | B1 | 3/2015 | Mishra |
| 9,241,353 | B2 | 1/2016 | Do et al. |
| 2007/0153741 | A1 | 7/2007 | Blanchette et al. |
| 2008/0008121 | A1 | 1/2008 | Alizadeh-Shabdiz |
| 2008/0186231 | A1 | 8/2008 | Aljadeff et al. |
| 2010/0008337 | A1 | 1/2010 | Bajko |
| 2010/0311437 | A1 | 12/2010 | Palanki et al. |
| 2011/0117924 | A1* | 5/2011 | Brunner ............... G01S 5/0252 455/456.1 |
| 2012/0294231 | A1 | 11/2012 | Finlow-Bates et al. |
| 2013/0028246 | A1 | 1/2013 | Gonikberg |
| 2013/0051303 | A1 | 2/2013 | Huang et al. |
| 2013/0170432 | A1 | 7/2013 | O'Brien et al. |
| 2013/0273938 | A1 | 10/2013 | Ng et al. |
| 2014/0133294 | A1 | 5/2014 | Horn et al. |
| 2014/0204903 | A1 | 7/2014 | Kim et al. |
| 2014/0274043 | A1 | 9/2014 | Das et al. |
| 2015/0133154 | A1 | 5/2015 | Do et al. |

OTHER PUBLICATIONS

International Search Report and Written Opinion—PCT/US2015/057423—ISA/EPO—dated Jan. 29, 2016.

Yu-Jia Z., et al., "AP Selection for Indoor Localization Based on Neighborhood Rough Sets," Vehicular Technology Conference (VTC Fall), 2012 IEEE, Sep. 3, 2012 (Sep. 3, 2012), pp. 1-5, XP032294920, DOI: 10.1109/VTCFALL.2012.6399345, ISBN: 978-1-4673-1880.

Shindo H., et al., "Virtual Access Point Allocation Method for High Density WLANs", Information Processing society of Japan—ICMU 2012, May 23, 2012 (May 23, 2012), pp. 69-76, XP55210531, Singapore Retrieved from the Internet: URL:http://www.icmu.org/icmu2012/papers/FP-10.pdf [retrieved on Sep. 1, 2015].

Arsham F., et al., "A microscopic look at WiFi fingerprinting for indoor mobile phone localization in diverse environments", International Conference on Indoor Positioning and Indoor Navigation, IEEE, Oct. 28, 2013 (Oct. 28, 2013), pp. 1-10, XP032595725, DOI: 10.1109/IPIN.2013.6817920 [retrieved on May 16, 2014].

Hossain A., et al., "Fingerprint-Based Location Estimation with Virtual Access Points", Computer Communications and Networks, 2008. ICCCN '08. Proceedings of 17th International Conference on, IEEE, Piscataway, NJ, USA, Aug. 3, 2008 (Aug. 3, 2008), pp. 1-6, XP031362210, ISBN: 979-1-4244-2389-7.

Shindo H., et al., "VASS: VAP Allocation Supporting System for Users", 19th DPS Workshop 2011 [DVD-ROM], The Information Processing Society of Japan, Sep. 28, 2011, pp. 25-31.

* cited by examiner

METHODS, APPARATUSES, AND DEVICES FOR MOBILE DEVICE POSITION ESTIMATION USING VIRTUAL ACCESS POINTS

BACKGROUND

1. Field

The subject matter disclosed herein relates to mobile electronic devices, and, more particularly, to methods, apparatuses, and articles of manufacture that may be used to estimate location of a mobile device using, for example, one or more virtual access points.

2. Information

The global positioning system (GPS), and other like satellite positioning systems (SPSs), have enabled navigation services for mobile handsets in many types of outdoor environments. However, since satellite signals may not be reliably received and/or acquired in some indoor environments, such as office complexes, shopping malls, indoor stadiums, and so forth, different techniques may be employed to enable indoor navigation services. For example, a mobile device in an indoor environment may typically obtain an estimated location by measuring ranges to three or more wireless access points that may be positioned at known, physically separate locations. Such ranges may be measured, for example, by measuring characteristics of signals acquired from wireless transceivers, such as wireless access points. In some instances, characteristics of acquired signals may comprise received signal strength and/or round trip signal delay measured between a mobile device and one or more physically separated wireless access points. In many position estimation approaches, increasing physical separation among wireless access points may permit greater accuracy in position estimation.

In some instances, an indoor environment may utilize one or more virtual access points comprising a single physical access point to transmit multiple beacon signals conveying unique identifiers, such as media access control identification (MAC ID) addresses and/or basic service set identifiers (BSSIDs), to mobile devices within range. Responsive to receipt of multiple beacon signals, a mobile device user may attempt to employ one or more position estimation approaches, such as round trip signal delay and/or comparison of received signal strength, with one or more radio heatmaps. However, in such instances, if multiple MAC IDs originate from a single physical access point, a mobile device may be unable to compute an accurate estimation of position. In instances such as these, a mobile device user may become disoriented within the indoor environment. Such disorientation may represent a source of frustration for the user as well as any individuals who might be scheduled to rendezvous with, for example, the mobile device user.

SUMMARY

Briefly, particular implementations may be directed to a method, at a mobile device, comprising acquiring multiple beacon signals, wherein each of the multiple acquired beacon signals is identified by identifiers encoded into each of the multiple acquired beacon signals. The method may further comprise computing an inference that two or more of the multiple acquired beacon signals originate from the same physical transceiver based, at least in part, on the identifiers and confirming that the two or more of the multiple acquired beacon signals originate from the same physical transceiver based, at least in part, on measurement of carrier signal characteristics of the multiple acquired beacon signals.

Another particular implementation may be directed to a mobile device comprising a receiver to acquire beacon signals from a communications channel, wherein unique identifiers are encoded in the acquired beacon signals. The mobile device may further comprise one or more processors coupled to the receiver. The one or more processors executing instructions to compute an inference that the acquired beacon signals emanate from the same transceiver based, at least in part, on the identifiers encoded in the acquired beacon signals, and determine that the acquired beacon signals emanate from the same transceiver based, at least in part, on measurement of carrier signal characteristics.

Another particular implementation may be directed to an article comprising a non-transitory machine-readable storage medium storing one or more programs for execution by one or more processors of a mobile device, the one or more programs comprising instructions to: obtain beacon signals, acquired at a receiver, each of the acquired beacon signals being identified by a unique identifier encoded into each of the acquired beacon signals; compute an inference that two or more of the acquired beacon signals originate from the same physical transceiver based, at least in part, on the unique identifiers encoded into each of the two or more of the acquired beacon signals; and confirm that the two or more of the acquired beacon signals originate from the same physical transceiver based, at least in part, on measurement of carrier signal characteristics of the two or more of the acquired beacon signals.

Another particular implementation may be directed to a mobile device comprising means for acquiring beacon signals, each of the acquired beacon signals being identified by different corresponding unique identifiers encoded into the each of the acquired beacon signals. The mobile device may additionally comprise means for inferring that two or more of the acquired beacon signals originate from the same physical transceiver based, at least in part, on the unique identifiers encoded into each of the two or more of the acquired beacon signals. The mobile device may additionally comprise means for confirming the two or more of the acquired beacon signals originate from the same physical transceiver based, at least in part, on measurement of carrier signal characteristics of the two or more of the acquired beacon signals.

It should be understood that the aforementioned implementations are merely example implementations, and that claimed subject matter is not necessarily limited to any particular aspect of these example implementations.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
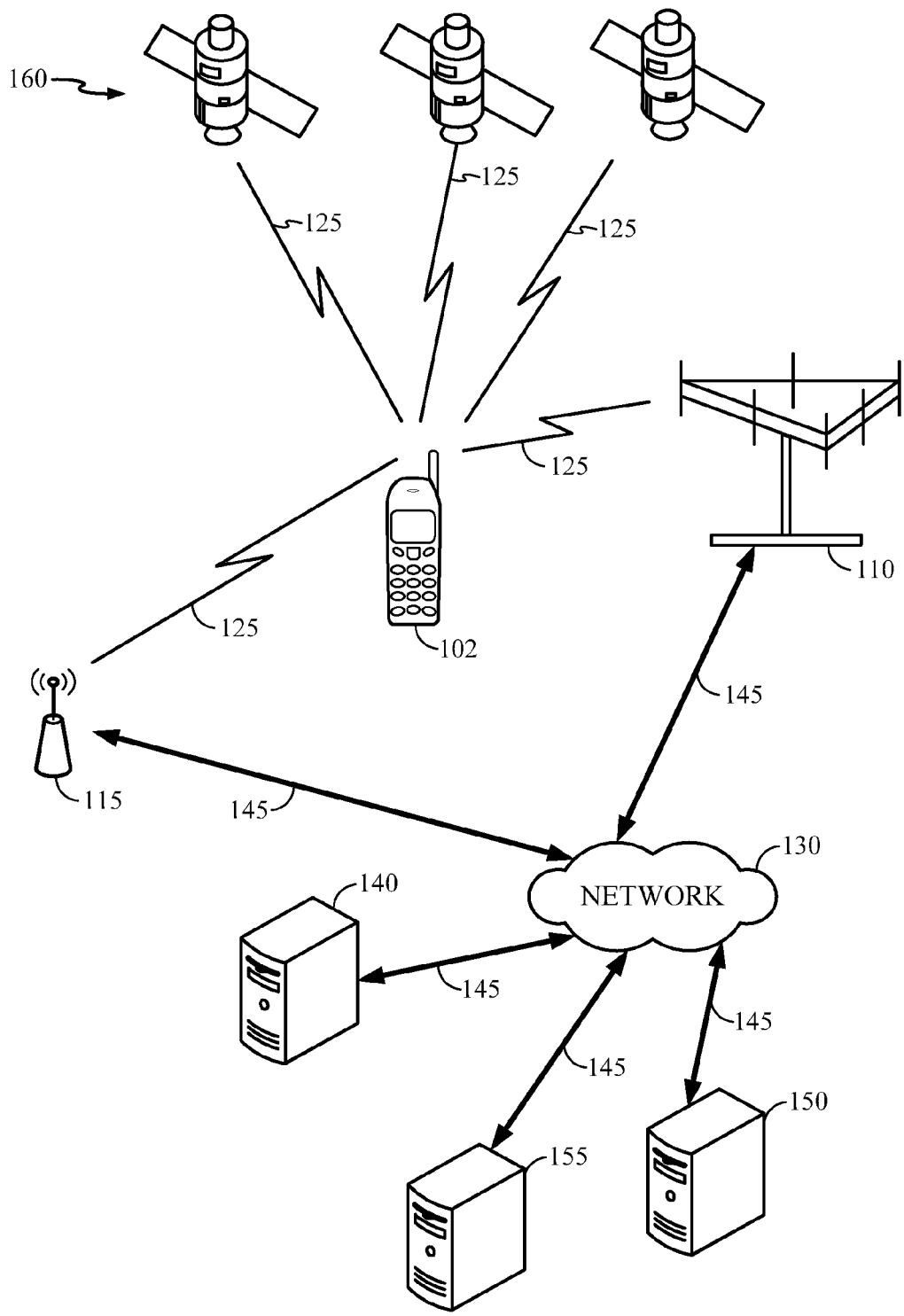
FIG. 1 is a schematic diagram of a network topology according to an embodiment.

In the following detailed description, numerous specific details are set forth to provide a thorough understanding of claimed subject matter. However, those skilled in the art will understand that claimed subject matter may be practiced without these specific details. In other instances, methods, apparatuses, and/or systems that would be known by one of ordinary skill have not been described in detail so as not to obscure claimed subject matter.

As used herein, "mobile electronic device," "mobile device," "wireless device," or the plural form of such terms may be used interchangeably and may refer to any kind of special purpose computing platform or apparatus that may from time to time occupy a position that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be referred to simply as "mobile devices," may include, for example, cellular telephones, smart telephones, personal digital assistants, wearable computers, wrist phones, laptop computers, personal entertainment systems, tablet personal computers, personal audio and/or video devices, personal navigation devices, or the like. It should be appreciated, however, that these are merely examples of mobile devices that may be used, at least in part, to implement one or more operations and/or techniques for estimating a position of a mobile device, for example, and that claimed subject matter is not limited in this respect. It should also be noted that the terms "position" and "location" may be used interchangeably herein.

In the context of the present application, a "virtual access point" or "VAP" may represent a single, physical wireless transceiver, such as a wireless access point, that may simulate or imitate multiple, physical wireless transceivers. In particular embodiments, a single, physical transceiver may transmit beacon signals to convey unique identifiers, such as MAC ID addresses or BSSIDs, that correspond to each of a plurality of VAPs. In certain embodiments, wireless communication signals from one or more VAPs of a single, physical transceiver, such as a wireless access point, may appear similar to communication signals originating from multiple transceivers. Accordingly, a mobile device may be unable to distinguish among communication signals, such as beacons conveying unique identifiers (e.g., MAC ID addresses, BSSIDs, or the like) originating from spatially diverse wireless access points, from signals emanating from VAPs of a single, physical wireless access point.

In some embodiments, a single physical transceiver, such as a wireless access point, may comprise multiple VAPs so as to enable differing security mechanisms corresponding to individual VAPs. Thus, in one possible example, a single transceiver, such as a wireless access point, may be located in an office environment. The single transceiver may comprise a first VAP to permit unsecured Internet access by nonemployee visitors and may comprise a second VAP to permit relatively secure access to a corporate intranet by employees only. A third VAP may permit office security personnel, for example, to review highly secured company and/or facility surveillance files. Thus, at least in certain embodiments, VAPs may employ a number of differing service features, which may include security and/or authentication settings, permission levels, file access privileges, and so forth, and claimed subject matter is not limited in this respect.

Also in the context of the present application, a beacon signal may be identified by unique identifiers, such as MAC ID addresses, BSSIDs, IP addresses, or the like. In embodiments, unique identifiers may comprise encoded hexadecimal characters at "baseband" signal frequencies. Baseband signals may operate, for example, at a binary digit transfer rate, for example, of between 0.0 Hz and a maximum binary digit transfer rate, such as 1 Mb per second, 10 Mb per second, 100 Mb per second, and so forth. Also in the context of the present application, a "carrier" signal may comprise a signal, such as a baseband signal, that has been modulated and upconverted to a frequency at which the signal may be launched across a communications channel. Carrier frequencies may comprise, for example, approximately 2.5 GHz, approximately 5.0 GHz, At times, a mobile device user situated within an indoor area, such as the previously described office complex, a shopping mall, an indoor amphitheater, etc., may attempt to estimate a current location using communication signals transmitted from wireless transceivers. For example, as previously discussed, a mobile device may attempt to estimate its current location by measuring ranges to three or more transceivers, such as wireless access points, that may be positioned at known, spatially diverse locations. Such ranges may be measured, for example, by obtaining unique identifiers, such as MAC ID addresses and/or BSSIDs from signals, such as beacons, acquired from such transceivers and measuring one or more characteristics of received signals. In particular embodiments, signal strength (RSSI) and/or round trip time (RTT) between a mobile device and a wireless transceiver may be measured and utilized to compute estimated location of the mobile device. In many position estimation approaches, larger separation, such as angular separation, among wireless transceivers, may give rise to increased accuracy in position estimation.

However, a mobile device may occasionally receive signals from wireless transceivers, such as one or more wireless VAPs, which may be co-located at a single, physical wireless access point. In these instances, a mobile device may be initially unaware that such signals originate from a single, physical transceiver and may attempt to employ one or more position estimation approaches. Thus, a mobile device may request positioning assistance parameters, from a location server, for example, such as RSSI and/or RTT heatmaps, under an assumption that the assistance parameters pertain to physically separate wireless access points. Accordingly, if the mobile device attempts to utilize a position estimation approach such as trilateration, the mobile device may perform such estimation with relatively low accuracy. Additional influences may degrade position estimation accuracy, and claimed subject matter is not limited in this respect.

In addition, if a mobile device is unable to differentiate among signals received from physically separated transceivers and signals received from transceivers located at a single physical location, a mobile device may receive redundant or unneeded positioning assistance parameters. For example, in an attempt to estimate its location, a mobile device may select to request a first group of positioning assistance parameters from a location server, such as radio heatmap parameters, which may indicate particular locations within an area and corresponding previously measured signal strengths. However, if the mobile device selects to request a second group of positioning assistance parameters pertaining to a VAP colocated at the same physical location, the second group of received or acquired positioning assistance parameters may be indistinguishable or even identical to the first. Accordingly, transmission of the second radio heatmap from a location server may represent an unneeded and/or unnecessary consumption of communications channel bandwidth, for example. Transmission of the second radio heatmap may be undesirable for additional reasons, such as unnecessary consumption of network and mobile device processing resources, and claimed subject matter is not limited in this respect.

In some embodiments, position estimation using VAPs may be performed with increased accuracy and/or in a manner that precludes download of redundant positioning assistance parameters from a location server and/or an access point, for example, to a mobile device. In particular embodiments, mobile device position estimation may be performed by first receiving, acquiring, and/or obtaining beacon signals transmitted by one or more wireless transceivers, such as wireless access points. Responsive to acquiring beacon signals conveying unique identifiers, such as MAC ID addresses and/or BSSIDs, a mobile device may distinguish beacon signals originating from a single, physical transceiver (e.g., VAPs) from beacon signals originating from physically separated transceivers. Responsive to distinguishing beacon signals from physically separated transceivers from beacon signals from transceivers colocated at a single location, a mobile device may compile a report comprising a prioritized list of access points and attributes of access points. In certain embodiments, a mobile device may utilize such a list to determine, for example, an indication that positioning assistance parameters pertaining to a first access point are likely to be identical or indistinguishable from positioning assistance parameters pertaining to a second wireless access point. In particular embodiments, a mobile device may utilize such a report to determine attributes, such as an indication that one or more virtual access points may be accessed for RTT measurements with acceptable reliability, such as reliability that exceeds a threshold value. In particular embodiments, a mobile device may utilize such a report to identify access points having attributes such as providing preferred capabilities, which may include, for example, password protection, authentication, and/or secure access. In particular embodiments, a mobile device may utilize such a report to record attributes of wireless access points that communicate reliably, such as, for example, using a relatively high-speed communications link, such as 10 Mb per second or faster. It should be noted that claimed subject matter is intended to embrace any combination of attributes, such as the above-identified attributes, as well as additional attributes of access points not listed, without limitation.

According to an embodiment, a receiver device may receive radio frequency energy transmitted in a beacon signal at an antenna and process the received energy using circuitry. Under certain conditions (such as sufficient signal-to-noise environment), a beacon signal received at a receiver may further be "acquired" by obtaining attributes or characteristics from the received beacon signal such as, for example, signal strength, unique identifier (such as, for example, MAC address), just to provide a couple of examples. In certain embodiments, a mobile device may compute an inference that acquired beacon signals originate from a single physical transceiver-based, for example, on identifiers encoded in acquired beacon signals. In certain embodiments, a mobile device may recognize similarity of unique identifiers, such as MAC ID addresses and/or BSSIDs, encoded in acquired beacon signals. In particular embodiments, MAC ID addresses and/or BSSIDs may differ by a predetermined number of hexadecimal characters, such as no more than one or two hexadecimal characters. Responsive to a computed inference, a mobile device may measure and/or detect characteristics of acquired beacon signals to confirm that the acquired beacon signals originate from a single wireless transceiver.

In particular embodiments, confirming that acquired beacon signals originate from a single wireless transceiver may comprise obtaining measurements of acquired beacon signals and correlating the acquired beacon signals based, at least in part, on similarity of measured signal parameters. For example, two or more acquired beacon signals may be correlated based, at least in part, on received signal strength of the two or more signals received at one or more locations. In another example, correlation of acquired beacon signals may be performed by measuring signals at two or more locations of an indoor area and determining, for example, that acquired signals differ from one another by an approximately constant value of received signal strength. In another example, correlation of acquired signals may be performed by measuring round-trip time of signals transmitted between a mobile device and a wireless transceiver, such as a wireless access point. In certain embodiments, if a mobile device, and/or a location server, confirms that two or more virtual access points share the same physical transceiver, the mobile device may prioritize receiving positioning assistance parameters from a first VAP relative to a second VAP, for example. Such prioritizing may be based on services provided by particular VAPs, signal quality of particular VAPs, link margin, bit error rate, VAP reliability, security levels and/or authentication settings, and so forth.

In certain embodiments, a first mobile device may compile a report of VAPs that correspond to (or map to) a particular physical transceiver. Additional mobile devices, which may operate in the vicinity of the first mobile device, may be requested or enlisted to "crowdsource" additional, similar reports. Reports may be transmitted, for example, to a server, such as a location server, which may consolidate reports from the first mobile device and from additional (e.g., crowdsourced) mobile devices to enable a server to confirm correspondence or mapping of VAPs to physical transceivers. Thus, responsive to one or more requests for positioning assistance parameters originating from, for example, one or more mobile devices, a server may transmit positioning assistance parameters on the basis of individual physical transceivers rather than on the basis of VAPs. Hence, in embodiments, if a location server is notified that two or more VAPs correspond or map to a single physical transceiver, a location server may avoid transmitting additional or redundant sets of positioning assistance parameters, such as heatmaps, that may correspond to VAPs sharing the same physical transceiver.

FIG. 1 is a schematic diagram of a network topology 100 according to an embodiment. As described below, one or more processes or operations for positioning mobile devices using virtual access points may be implemented in a signal environment that may be utilized by mobile device 102, for example. It should be appreciated that network topology 100 is described herein as a non-limiting example that may be implemented, in whole or in part, in the context of various communications networks or combination of networks, such as public networks (e.g., the Internet, the World Wide Web), private networks (e.g., intranets), wireless local area networks (WLAN, etc.), or the like. It should also be noted that claimed subject matter is not limited to any particular type of outdoor or indoor implementation. For example, at times, one or more operations or techniques described herein may be performed, at least in part, in an environment that may comprise indoor environments, dense urban environments, partially indoor/outdoor environments, such as amphitheaters, partially enclosed sports stadiums, and so forth, and claimed subject matter is not limited in this respect.

As illustrated, network topology 100 may comprise, for example, one or more space vehicles 160, cellular base station 110, wireless transceiver 115, etc. capable of communicating with mobile device 102 via wireless communication links 125 in accordance with one or more protocols. Space vehicles 160 may be associated with one or more satellite positioning systems (SPS), such as, for example, the United States Global Positioning System (GPS), the Russian GLONASS system, the European Galileo system, as well as any system that may utilize space vehicles from a combination of SPSs, or any SPS developed in the future. Space vehicles 160 may also represent one or more orbiting space vehicles of a regional satellite navigation system such as, for example, Quasi-Zenith Satellite System (QZSS) over Japan, Indian Regional Navigational Satellite System (IRNSS) over India, Beidou/Compass over China, etc., and/or various augmentation systems (e.g., an Satellite Based Augmentation System (SBAS)) that may be associated with or otherwise enabled for use with one or more global and/or regional navigation satellite systems. It should be noted that claimed subject matter is not limited to the use of space vehicles such as those space vehicles of the aforementioned global or regional satellite navigation systems. Cellular base station 110, wireless transceiver 115, etc. may be of the same or similar type, for example, or may represent different types of devices, such as access points, radio beacons, cellular base stations, femtocells, or the like, depending on an implementation. At times, one or more wireless transceiver, such as wireless transceiver 115, for example, may be capable of transmitting as well as receiving wireless signals.

In some instances, one or more cellular base stations 110, wireless transceiver 115, etc. may, for example, be operatively coupled to a network 130 comprising one or more wired or wireless communications or computing networks capable of transmitting messages including items, such as an electronic digital map, that may be relevant to a mobile device user's estimated location via one or more wireless communication links 125, 145, and so forth. A position of mobile device 102 may be estimated by relating received signal strength with expected and/or predicted values from a radio heatmap.

Even though a certain number of computing platforms or devices are illustrated herein, any number of suitable computing platforms or devices may be implemented to facilitate or otherwise support one or more techniques or processes associated with network topology 100. For example, at times, network 130 may be coupled to one or more wired or wireless communications networks (e.g., Wi-Fi, etc.) so as to enhance a predominantly indoor coverage area for communications with mobile device 102, one or more base transceiver stations 110, wireless transceiver 115, servers 140, 150, 155, or the like. In some instances, network 130 may facilitate or support femtocell-based operative regions of coverage, for example. Again, these are merely example implementations, and claimed subject matter is not limited in this regard.

Figure 2:
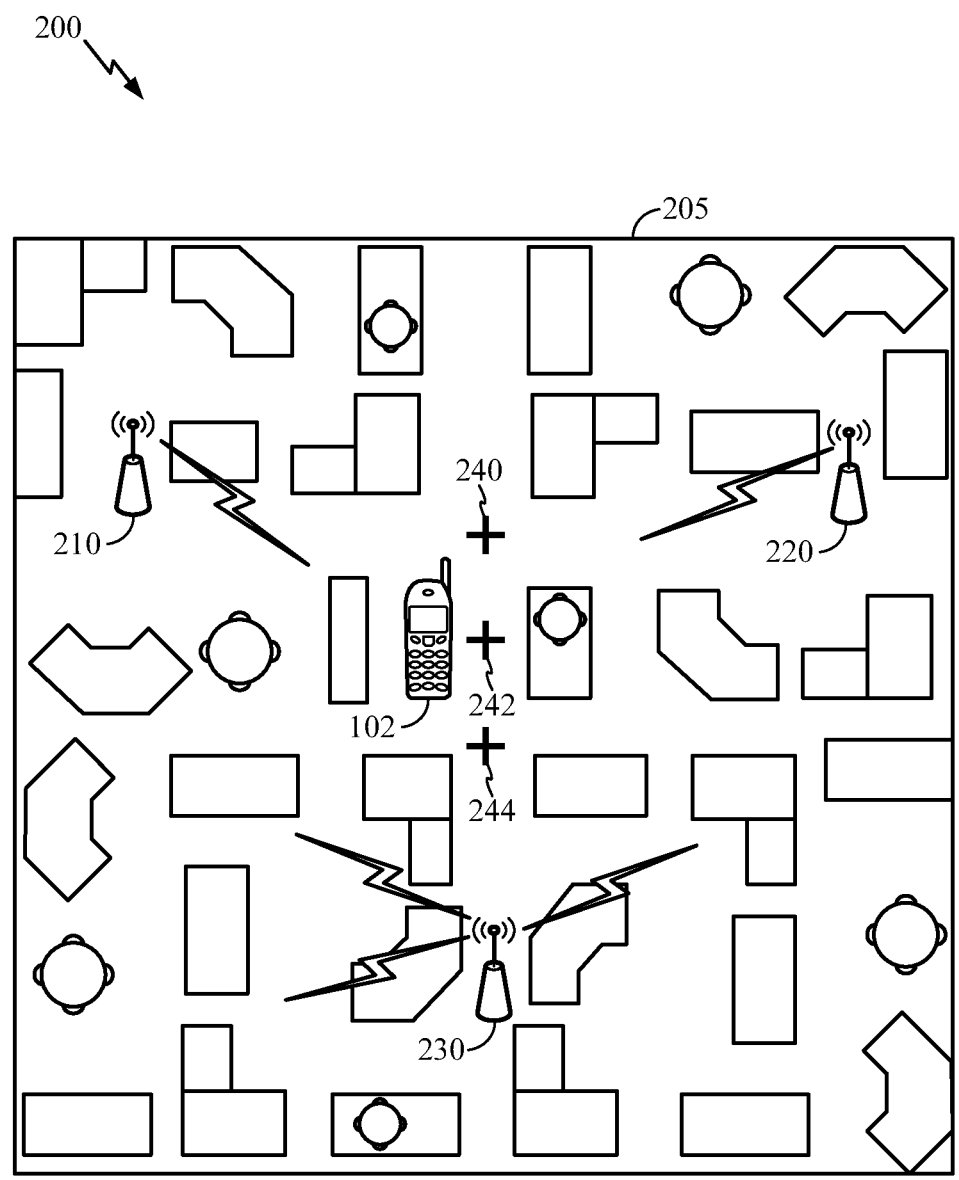
FIG. 2 is a diagram of an indoor area showing a mobile device in communication with physical access points and virtual access points (VAPs) according to an embodiment.

FIG. 2 is a schematic diagram 200 of an indoor area showing a mobile device in communication with physical access points and a virtual access point according to an embodiment. Schematic diagram 200 shows wireless access point 210, near an upper left portion of indoor area 205, which may communicate with mobile device 102. Likewise, wireless access point 220, near an upper right portion of indoor area 205, may also communicate with mobile device 102. In embodiments, wireless access point 230 may represent a single, physical wireless access point comprising multiple VAPs.

In an embodiment, wireless access points 210 and 220 represent wireless transceivers broadcasting a beacon comprising a single unique identifier, such as a MAC ID address and/or a BSSID. Thus, mobile device 102 may store received or acquired positioning assistance parameters that may be used to correlate signal characteristics observed at various locations within indoor area 205 with previously measured indications of received signal strength (RSSI) and/or signal round-trip time (RTT). Thus, in one possible example, at location 240, mobile device 102 may measure received signal strength (RSSI) with respect to wireless access point 210 of approximately −70.0 DBM. Likewise, mobile device 102 may measure RSSI at location 240 of approximately −72.0 DBM with respect to wireless access point 220, for example. Mobile device 102 may then correlate measured RSSI with RSSI values of a stored heatmap to assist in estimating the mobile device's location.

In addition to using heatmaps to relate measured RSSI with stored RSSI values, mobile device 102 may additionally receive and store heatmaps comprising previously measured values of RTT between, for example, locations 240, 242, and 244, and access point 210. Likewise, mobile device 102 may receive and store a heatmap comprising previously measured values of RTT between, for example, locations 240, 242, and 244, and access point 220. In embodiments, results of comparisons of RSSI and RTT with stored heatmaps may be combined and filtered by one or more processors of mobile device 102 to improve accuracy of position estimation. It should be noted that although RSSI and RTT heatmaps are mentioned as examples of positioning assistance parameters transmitted to mobile device 102, other types of positioning assistance parameters may be provided and claimed subject matter is not limited in this respect.

In embodiments, wireless access point 230 may represent a single, physical wireless access point comprising multiple VAPs. Thus, wireless access point 230 may transmit multiple BSSIDs, such as two BSSIDs, three BSSIDs, four BSSID, and so forth, and claimed subject matter is not limited to any particular number of unique identifiers, such as BSSIDs and/or MAC ID addresses. Hence, for example, responsive to receipt of a beacon signal conveying a first BSSID, mobile device 102 may initiate communications with wireless access point 230 to request positioning assistance parameters, such as RSSI and/or RTT heatmaps. In response to a request from mobile device 102, wireless access point 230 may transmit positioning assistance parameters, such as RSSI and/or RTT heatmaps, to mobile device 102.

In certain embodiments, if mobile device 102 acquires a second beacon signal from wireless access point 230, mobile device 102 may recognize that the first and second beacon signals comprise similar encoded identifiers. For example, unique identifiers may differ by a predetermined number of encoded characters and/or symbols, such as two hexadecimal characters, three hexadecimal characters, and so forth. Based, at least in part, on a recognized similarity among encoded identifiers, mobile device 102 may measure one or more signal characteristics, such as observed values of RSSI of the first and second beacon signals and/or RTT of signals transmitted between mobile device 102 and wireless access points 230. In embodiments, if signal characteristics of the first and second beacon signals approximate one another, mobile device 102 may regard the first and second beacon signals as originating from VAPs sharing the same, physical transceiver (e.g., wireless access points 230).

In the embodiment of FIG. 2, responsive to a mobile device 102 detecting that first and second beacon signals originate from the same physical transceiver, the mobile device may modify one or more operations. In one example, mobile device 102 may select to request a single group of positioning assistance parameters from wireless access point 230. Mobile device 102 may initiate such a request based, for example, on which of first and second beacon signals from wireless access point 230 gives rise to greater received signal strength, higher link margin, lower signal-to-noise ratio, and so forth. In another example, mobile device 102 may modify a scanning schedule in which, for example, communications channels utilized by first and second beacons of wireless access point 230 are scanned over increased intervals (e.g., less often). Likewise, communication channels utilized by wireless access point 210 and 220 may be scanned at decreased intervals (e.g., more often).

In particular embodiments, wireless access points 210, 220, and 230 may communicate with one or more of servers 140, 150, and/or 155 of FIG. 1, which may operate as location servers. In certain embodiments, responsive to a request initiated by mobile device 102, one or more of servers 140, 150, and/or 155 may convey electronic digital maps, for example, as well as other positioning assistance parameters to mobile device 102. In particular embodiments, responsive to mobile device 102 compiling a prioritized list of wireless access points, mobile device 102 may transmit identifiers corresponding to particular wireless access points to one or more of servers 140, 150, and/or 155. Such selections may represent, for example, wireless access points selected by mobile device 102 for use by the mobile device in estimating position, obtaining secured file access, or for obtaining other services.

Figure 3:
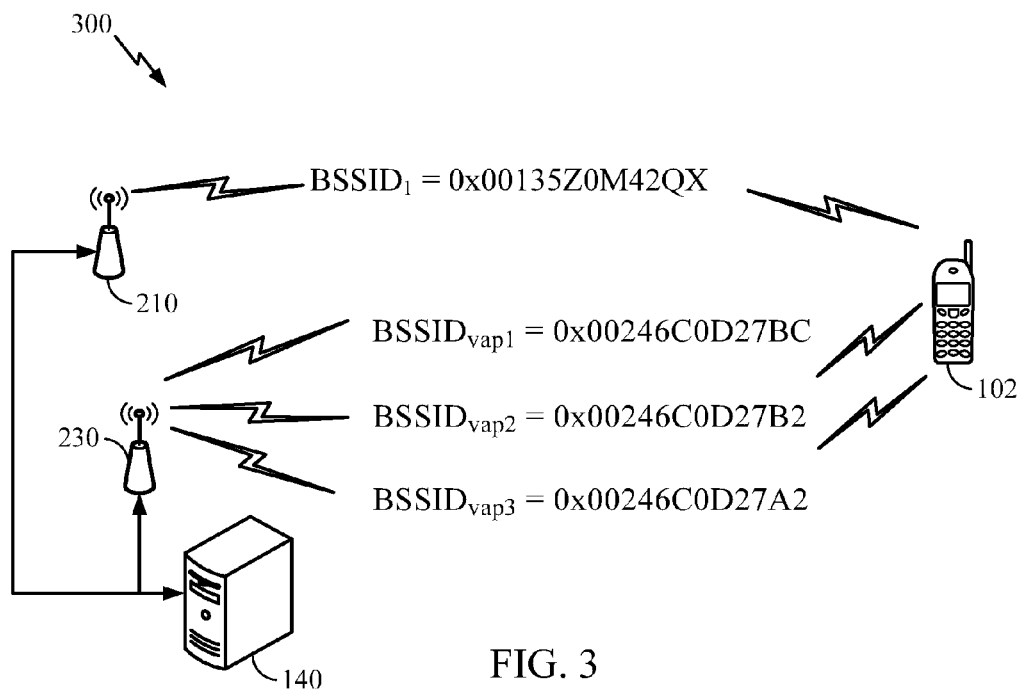
FIG. 3 is a schematic diagram illustrating encoded BSSIDs transmitted from a wireless access points comprising multiple VAPs according to an embodiment.

FIG. 3 is a schematic diagram 300 illustrating encoded identifiers of BSSIDs transmitted from a wireless access point comprising multiple VAPs according to an embodiment. In FIG. 3, for example, a beacon signal conveying $BSSID_1$, which may originate from wireless access point 210, may be acquired at mobile device 102. Mobile device 102 may receive, acquire, and/or obtain additional beacon signals conveying BSSIDs, such as $BSSID_{vap1}$, $BSSID_{vap2}$, and $BSSID_{vap3}$, which may identify VAPs co-located with access point 230. Access point 230 may transmit signals encoding additional BSSIDs and/or MAC ID addresses that may identify additional VAPs that may be acquired by mobile device 102, and claimed subject matter is not limited in this respect. In particular embodiments, access points 230 and/or 210 may receive assistance parameters, such as electronic digital maps, RSSI and/or RTT heatmaps, for example, from location server 140, for example, for transmission to mobile device 102.

In FIG. 3, $BSSID_{vap1}$ may be assigned an address of 0x00246C0D27BC, which differs from an address assigned to $BSSID_{vap2}$ only in the last hexadecimal character (e.g., 0x00246C0D27BC versus 0x00246C0D27B2). Further, $BSSID_{vap3}$ differs from $BSSID_{vap2}$ only in the last two hexadecimal characters (e.g., 0x00246C0D27B2 versus 0x00246C0D27A2, for example. Thus, at least in certain embodiments, mobile device 102 may recognize similarity between or among BSSIDs to infer received and acquired BSSIDs as originating from a single wireless access point, such as wireless access point 230. It should be noted that mobile device 102 may recognize additional similarities between or among BSSIDs, and claimed subject matter is not limited in this respect.

Figure 4A:
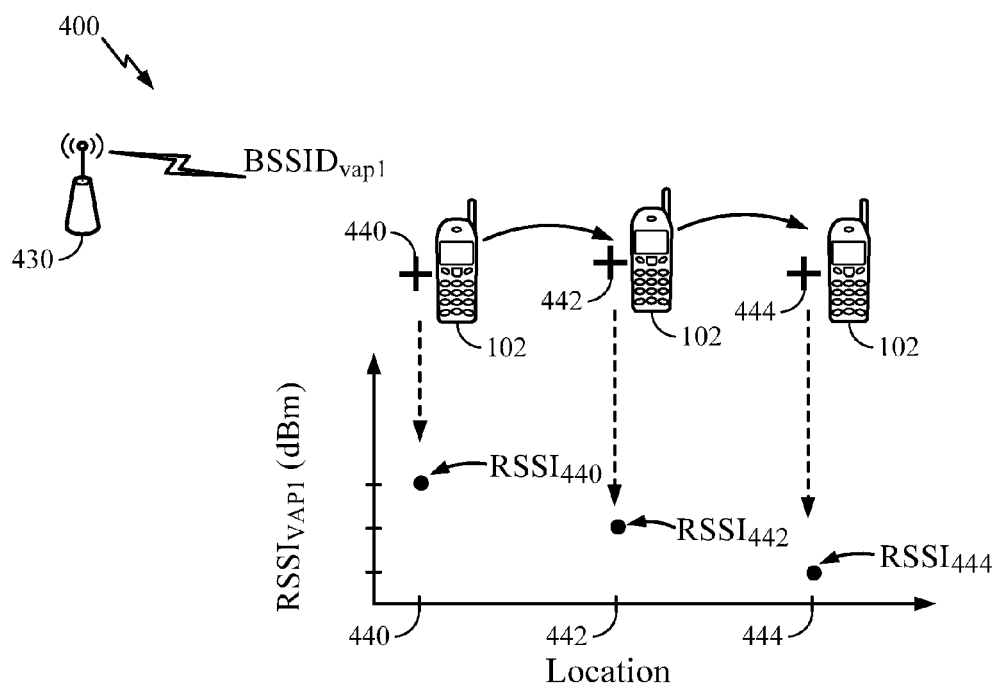
FIGS. 4A-4B are a schematic diagrams of a wireless access point comprising at least one VAP transmitting one or more beacon signals according to an embodiment.

FIG. 4A is a schematic diagram 400 of a wireless access point comprising a VAP transmitting a beacon signal according to an embodiment. Responsive to receipt of a unique identifier, such as $BSSID_{vap1}$, mobile device 102 may request positioning assistance parameters, sometimes also referred to as assistance data, such as RSSI and/or RTT heatmaps, from wireless access point 430 and/or a location server accessed via wireless access point 430, for example. In the embodiment of FIG. 4A, heatmaps obtained by mobile device 102 may comprise RSSI values previously measured at locations 440, 442, and 444. As a user colocated with mobile device 102 moves about, the mobile device may relate received signal strength with RSSI values obtained from the RSSI heatmap. For example, if mobile device 102 is positioned at or near by location 440, the mobile device may observe an RSSI of $RSSI_{440}$, as shown in FIG. 4A. As mobile device 102 is moved to location 442, the mobile device may observe a RSSI value of $RSSI_{442}$. As mobile device 102 is moved to location 444, the mobile device may observe a RSSI value of $RSSI_{444}$.

Figure 4B:
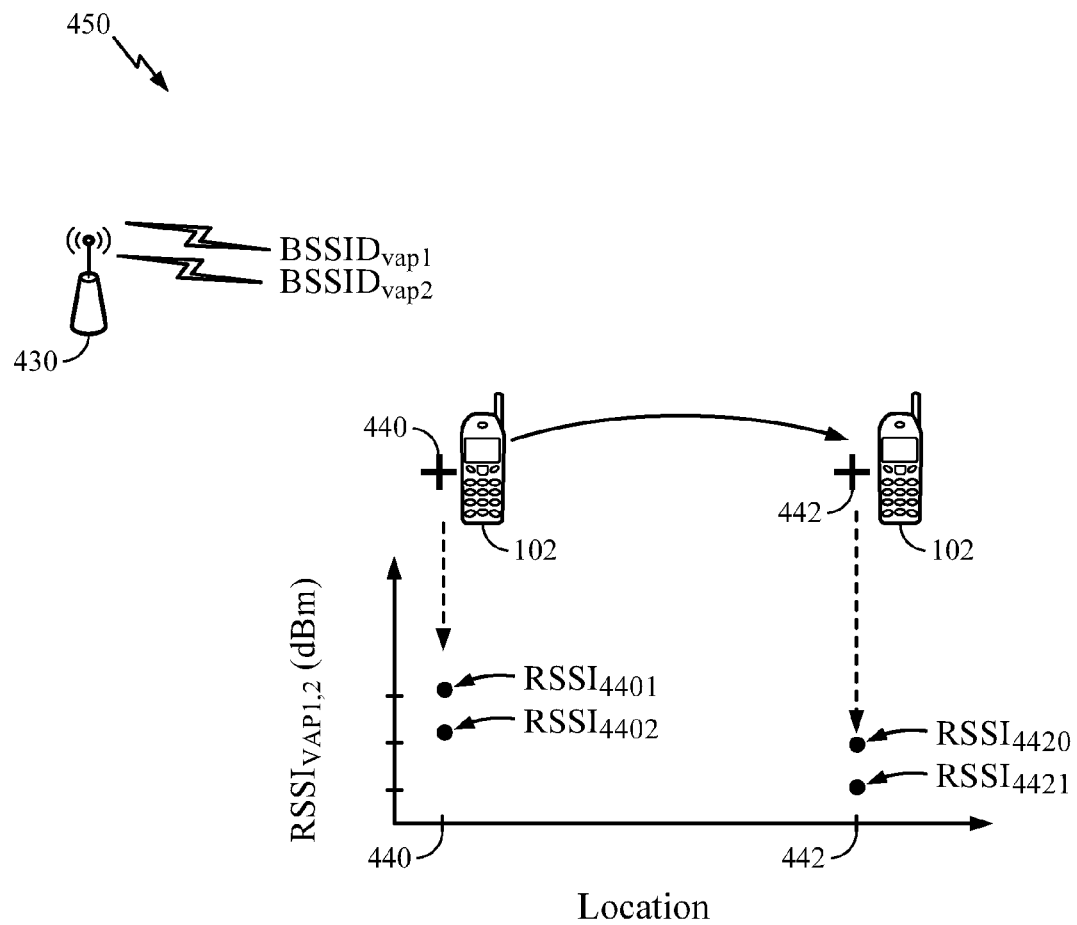

FIG. 4B is a schematic diagram 450 of a wireless access point comprising VAP1 and VAP2 transmitting beacon signals and/or MAC ID addresses according to an embodiment. In particular embodiments, mobile device 102 may have already obtained one or more heatmaps, such as a RSSI heatmap described with reference to FIG. 4A, and may operate to estimate current locations by relating observed RSSI with the obtained heatmap. In the embodiment of FIG. 4B, for example, mobile device 102 may additionally receive, acquire, and/or obtain a second beacon signal, such as $BSSID_{vap2}$. In embodiments, responsive to receipt of $BSSID_{vap2}$, mobile device 102 may compare encoded identifiers of $BSSID_{vap2}$ with those of $BSSID_{vap1}$. As mentioned previously herein, in certain embodiments, similarity between or among characters and/or symbols encoded into a unique identifier, such as MAC ID addresses and/or BSSIDs, may be utilized by mobile device 102 to compute an inference that beacon signals originate from a single, physical transceiver, such as wireless access point 430.

Responsive to computing an inference that $BSSID_{vap2}$ and $BSSID_{vap1}$ likely originate from a single, physical transceiver, detection or recognition of similarity between or among identifiers encoded in BSSIDs, mobile device 102 may operate to confirm the computed inference using received signal characteristics. Thus, in particular embodiments, mobile device 102 may compare received signal strength of a first beacon signal, such as $BSSID_{vap1}$, with received signal strength of a second beacon signal, such as $BSSID_{vap2}$. In certain embodiments, such comparisons may be performed at one or more locations of an indoor area, such as locations 440, 442, and 444. In implementations, mobile device 102 may confirm based, at least in part, on recognized similarity of received signal strength at one or more of locations 440, 442, and/or 444, for example, that $BSSID_{vap1}$ and $BSSID_{vap2}$ originate from a single, physical access point.

For example, in the particular embodiment of FIG. 4B, mobile device 102 at location 440 may observe $RSSI_{4401}$, which may represent received signal strength of $BSSID_{vap1}$. If $RSSI_{4401}$ is similar to or approximate to of $RSSI_{4402}$, which may represent received signal strength of $BSSID_{vap2}$, mobile device 102 may confirm that $BSSID_{vap1}$ and $BSSID_{vap2}$ originate from wireless access point 430. Likewise, mobile device 102 at location 442 may observe $RSSI_{4421}$, which may represent received signal strength of $BSSID_{vap2}$. If $RSSI_{4421}$ may be determined to be similar or approximate to that of $RSSI_{4420}$, which may represent received signal strength of $BSSI_{vap1}$, mobile device 102 may further confirm that $BSSID_{vap1}$ and $BSSID_{vap2}$ originate from wireless access point 430.

In certain embodiments, responsive to confirming that received, acquired, and/or obtained beacon signals, such as $BSSID_{vap1}$ and $BSSID_{vap2}$, originate from a single, physical transceiver, mobile device 102 may refrain from requesting additional positioning assistance parameters from wireless access point 430. In particular embodiments, if mobile device 102 has already obtained positioning assistance parameters, such as RSSI heatmaps and/or RTT heatmaps, one or more processors of mobile device 102, for example, may classify such additional heatmaps as unnecessary or redundant. Hence, mobile device 102 may discard additional positioning assistance parameters.

In particular embodiments, although beacon signals conveying unique identifier, such as $BSSID_{vap1}$ and $BSSID_{vap2}$ may originate from a single transceiver, received signal strengths observed at a mobile device may nonetheless differ. In one possible example, a wireless access point may transmit a first beacon signal, such as $BSSID_{vap1}$, using a transmission power level of approximately +23.0 dBm (approximately 200.0 mW). A second beacon signal, such as $BSSID_{vap2}$, may be transmitted at a power level of, for example, approximately +20.0 dBm (approximately 100.0 mW). In such instances, mobile device 102 may confirm that $BSSID_{vap1}$ and $BSSID_{vap2}$ originate from a single transceiver based, at least in part, an approximately constant difference among observed RSSI values at an approximately identical location. For example, in FIG. 4B, if $RSSI_{4401}$ and $RSSI_{4402}$ differ by approximately 3.0 dBm, and if $RSSI_{4420}$ and $RSSI_{4421}$ also differ by approximately 3.0 dBm, mobile device 102 may confirm that $BSSID_{vap1}$ and $BSSID_{vap2}$ originate from a single transceiver. It should be pointed out that other differences may be observed in beacon signal characteristics, and claimed subject matter is intended to embrace all such differences.

Thus, in one possible embodiment, correlating received signal strength of two or more acquired beacon signals may comprise measuring signal strength of two or more acquired beacon signals at two or more locations (such as location 440 and location 442). Correlating may additionally comprise recognizing that signal strength of one of the acquired beacon signals differs approximately by a constant between location 440 and location 442 (such as $RSSI_{4401}$ relative to $RSSI_{4420}$ of FIG. 4B). Correlating may further comprise recognizing that signal strength of another of the acquired beacon signals differs approximately by a constant between location 440 and location 442 (such as $RSSI_{4402}$ relative to $RSSI_{4421}$ of FIG. 4B).

Although mobile device 102 of FIG. 4B is described as performing certain operations, such as inferring and/or confirming that beacon signals $BSSID_{vap2}$ and $BSSID_{vap1}$ may originate from a single, physical transceiver, in certain embodiments, such operations may be performed by other network elements. For example, comparing encoded identifiers $BSSID_{vap2}$ with those of $BSSID_{vap1}$ to compute an inference that beacon signals originate from a single, physical transceiver may be performed using location server 140 of FIGS. 1 and 3. Further, location server 140 may additionally be involved in utilizing recognized similarity of received signal strengths to confirm that at $BSSID_{vap1}$ and $BSSID_{vap2}$ originate from a single, physical access point.

In particular embodiments, a plurality of mobile devices, such as mobile device 102, may compile one or more reports of virtual access points that correspond to the same physical transceiver. For example, in FIG. 4B, mobile device 102, along with additional mobile devices not shown in FIG. 4B, may suspect or infer that $BSSID_{vap1}$ and $BSSID_{vap2}$ correspond to the same physical wireless access points, such as wireless access point 430. Thus, mobile devices, such as mobile device 102, may generate one or more crowdsourced reports, in which services of a number of mobile devices may be enlisted to provide reports of virtual access points that may correspond to the same physical transceiver. Crowdsourced reports, which may be transmitted to a location server, for example, may enable a location service to confirm that, for example, $BSSID_{vap1}$ and $BSSID_{vap2}$ correspond to wireless access point 430. Responsive to such confirmation, a location server may generate a consolidated list of VAPs that correspond to a single physical transceiver and transmit the consolidated list to one or more mobile devices. Accordingly, mobile device 102 may request assistance parameters, such as one or more heatmaps, from a single virtual access point (such one of $BSSID_{vap1}$) and avoid requesting redundant assistance parameters from a second virtual access point (and $BSSID_{vap2}$).

Figure 5:
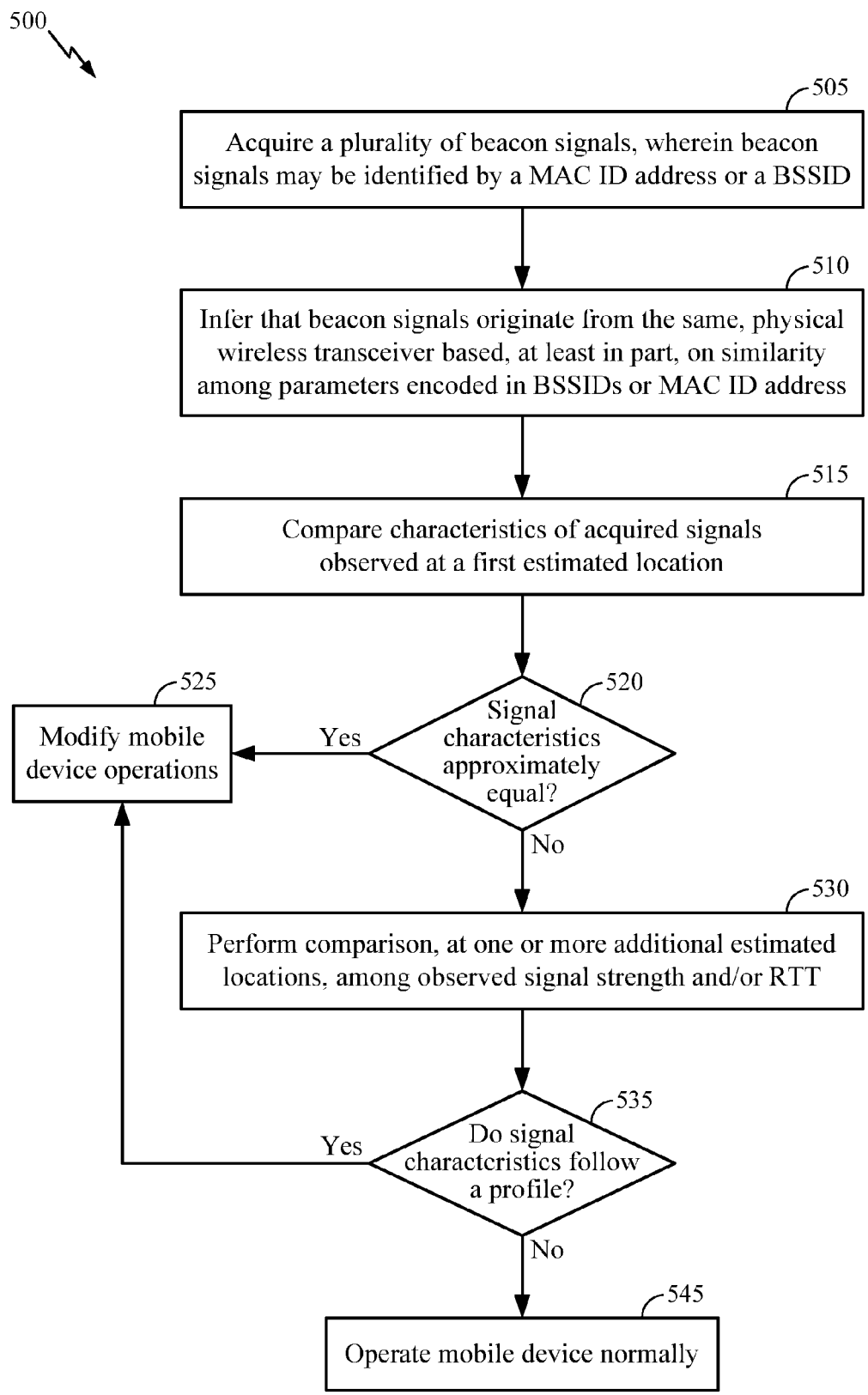
FIGS. 5-6 are flow diagrams for method for estimating a location of a mobile device using virtual access points according to an embodiment.

FIG. 5 is a flow diagram 500 for a method of estimating a location of a mobile device using virtual access points according to an embodiment. Although the method of FIG. 5 may be performed at, for example, mobile device 102 in communication with one or more wireless transceivers, in other embodiments, the method of FIG. 5, or portions thereof, may be performed at or by other types of wireless devices and/or network elements in communication with one or more transceivers, and claimed subject matter is not limited in this respect. Example implementations, such as those described in FIG. 5, may include blocks in addition to those shown and described, fewer blocks, or blocks occurring in an order different than may be identified, or any combination thereof.

The method of FIG. 5 may begin at block 505, which may comprise acquiring, by a mobile device for example, beacon signals, which may be identified by a MAC ID address and/or a BSSID. At 510, a mobile device may compute an inference that beacon signals originate from the same, physical transceiver, such as a wireless access point. The computed inference may be based, at least in part, on recognizing one or more similarities among characters and/or symbols encoded into a unique identifier, such as MAC ID addresses or BSSIDs. In particular embodiments, MAC ID addresses or BSSIDs may comprise substantially similar encoded identifiers that differ, for example, in one or two hexadecimal characters and/or characters such as, for example, least significant hexadecimal characters.

At 515, a mobile device may compare characteristics of acquired beacon signals observed at a first location. Characteristics of acquired beacon signals may comprise a RSSI and/or RTT between the mobile device and a transceiver. At 520, a mobile device may determine if signal characteristics among acquired beacon signals are approximately equal, which may suggest that beacon signals originate from differing VAPs of the same physical transceiver. In one example, if the decision of block 520 indicates that received signal strength of acquired beacon signals differ by less than approximately 3.0 dBm, the decision of block 520 may bring about performing block 525. In another example, if RTTs between a mobile device and a transceiver differ by, for example, approximately 0.25 μs, the decision of block 520 may bring about performing block 525. In these instances, and potentially many others, block 525 may represent a mobile device modifying mobile device operations, such as selecting to request positioning assistance parameters pertaining to a single VAP of a wireless transceiver. In particular embodiments, block 525 may comprise a mobile device compiling a prioritized list of access points and attributes, for example, of access points. A prioritized list may be used to modify scan intervals in which, for example, communication channels utilized by one or more VAPs are scanned less often in relation to communication channels utilized by conventional wireless access points.

If the decision of block 520 indicates that signal characteristics of acquired beacon signals are not approximately equal, such as differing by more than approximately 3.0 dBm, the method may proceed at block 530. At block 530, a mobile device may perform a comparison among acquired beacon signals at one or more additional estimated locations. If the decision of block 535 indicates that received signal strength of acquired beacon signals appears to follow a profile, such as differing by constant amplitude, a mobile device may determine that acquired beacon signals originate from the same, physical transceiver but differ in amplitude by an approximately constant received power level. If the decision of block 535 indicates that signal strengths of acquired beacon signals differ by an approximately constant received power, block 525 may be performed. In particular embodiments, block 525 may comprise a mobile device compiling a prioritized list of access points and attributes, for example, of access points. A prioritized list may be used to modify scan intervals in which, for example, communication channels utilized by one or more VAPs are scanned less often in relation to communication channels utilized by conventional wireless access points.

If the decision of block 535 indicates that signal characteristics, such as received signal strength, do not appear to follow a profile, block 545 may be performed in which a mobile device may operate in a normal (unmodified) manner. In certain embodiments, block 545 may represent a mobile device operating in an environment within which VAPs do not appear to be in range. Accordingly, acquired beacon signals may likely originate from differing transceivers such as physically separated wireless access points. Thus, block 545 may comprise a mobile device selecting to request positioning assistance parameters, for example, from all wireless access points within range. Block 545 may additionally comprise, for example, the mobile device estimating range from physically separated access points.

It should be noted that portions of FIG. 5, such as one or more of blocks 510, 515, 520, 530, and 535, may be performed, for example by a location server, such as location server 140 (FIGS. 1 and 3). In particular embodiments, computing an inference, comparing, and other such operations at a server, such as a location server, may result in reducing mobile device processing burden, for example. This may represent a more efficient allocation of processing resources among communications network elements involved in mobile device position estimations using virtual access points.

Figure 6:
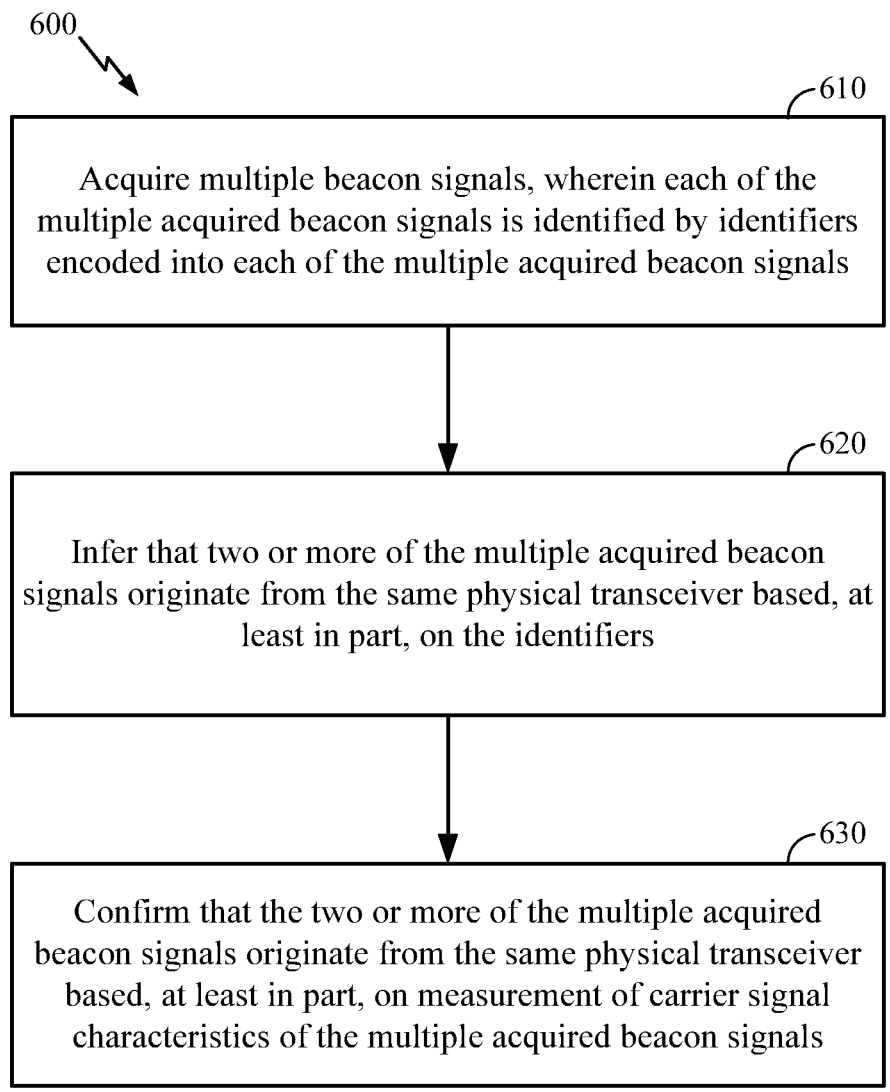

FIG. 6 is a flow diagram 600 for mobile device position estimation using virtual access points according to another embodiment. Although the method of FIG. 6 may be performed by, for example, mobile device 102 in communication with one or more wireless access points, such as access point 230 of FIGS. 2 and 3, the method of FIG. 6 may be performed by other types of wireless transceivers in communication with one or more transceivers, and claimed subject matter is not limited in this respect. Example implementations, such as described in FIG. 6, may include actions or operations in addition to those shown in the blocks of diagram 600. Example implementations may also include fewer actions or operations, or actions or operations occurring in a different order, or any combination thereof.

The method of FIG. 6 may begin at block 610 in which a mobile device, such as mobile device 102 of FIG. 1, for example, may acquire multiple beacon signals identified by corresponding identifiers, such as unique identifiers (e.g., MAC ID address, BSSID, and so forth) encoded into one or more of the beacon signals. In embodiments, each of the acquired beacon signals may comprise characters and/or symbols, such as hexadecimal characters. At block 620, the mobile device may compute an inference that two or more of the multiple acquired beacon signals, which may be identified by, for example, unique identifiers, originate from the same physical access point based, at least in part, on characters and/or symbols encoded into identifiers of the acquired beacon signals. Block 620 may comprise, for example, a mobile device detecting similarity among unique identifiers, such as MAC ID addresses or BSSIDs of acquired signals. The method may proceed at block 630, which may comprise confirming that the two or more of the multiple acquired beacon signals originate from the same physical transceiver, such as a wireless access point, at least partially based on the measurement of signal characteristics of the multiple acquired beacon signals. Signal characteristics may comprise RSSI, RTT between a mobile device and a wireless transceiver, or a combination thereof. It is understood that after block 610, some implementations of the method may include only one of block 620 or block 630. For example, the method may include a mobile device acquiring multiple beacon signals identified by corresponding identifiers encoded into one or more of the beacon signals. The method may then proceed to block 630, which may comprise determining that two or more of the multiple acquired beacon signals originate from the same physical transceiver, without computing an inference, at least partially based on the measurement of signal characteristics of the multiple acquired beacon signals. The mobile device, may compile one or more reports of virtual access points that correspond to the same physical transceiver based on such a determination. A server may then compile such reports from multiple mobile devices in order to confirm the determination of the mobile device (crowdsourced data). Alternatively, the method may include a mobile device acquiring multiple beacon signals identified by corresponding identifiers encoded into one or more of the beacon signals and then computing an inference that two or more of the multiple acquired beacon signals originate from the same physical access point. The inference may, in some implementations, not be confirmed by the mobile device, but rather by a server. For example, the mobile device may compile one or more reports of virtual access points that are inferred to correspond to the same physical transceiver. A server may then compile such reports of inferred virtual access points that correspond to the same physical access point, along with measurement data of signal characteristics of the multiple acquired beacon signals. The server may then confirm that the beacon signals originate from the same physical transceiver. Hence, in various implementations, it is understood that a mobile device may perform steps corresponding to block 620 while a server performs steps corresponding to block 630, or vice versa.

In embodiments, one or more blocks of FIG. 6 may be performed at a server, such as a location server. For example, block 620 may involve a location server computing an inference that two or more acquired beacon signals, identified by unique identifiers, originate from the same fiscal transceiver based, at least in part, on the unique identifiers encoded into the acquired beacon signals. Likewise, block 630 may involve a location server confirming that acquired beacon signals originate from the same fiscal transceiver based, at least in part, on measurement of carrier signal characteristics of acquired beacon signals.

Figure 7:
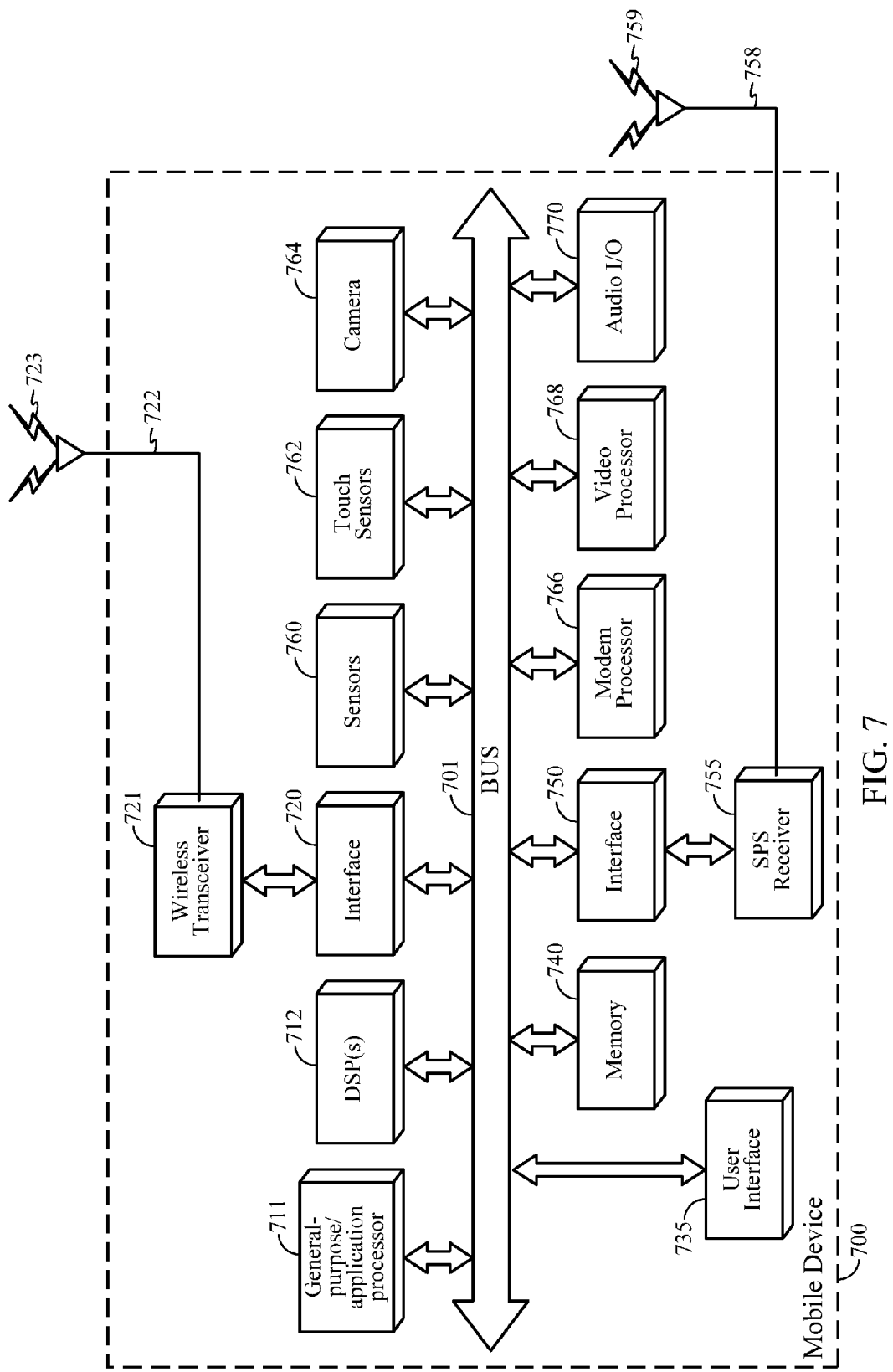
FIG. 7 is a schematic block diagram illustrating an exemplary device, in accordance with an embodiment.

FIG. 7 is a schematic diagram of a mobile device 700 according to an embodiment. Mobile device 102 (FIG. 1) may comprise one or more features of mobile device 700 shown in FIG. 7. In certain embodiments, mobile device 700 may also comprise wireless transceiver 721, which is capable of transmitting and receiving wireless signals 723 via antenna 722 over a wireless communication network. Wireless transceiver 721 may be coupled to bus 701 by way of wireless transceiver a bus interface. A wireless transceiver bus interface may, in some embodiments be at least partially integrated with wireless transceiver 721. Some embodiments may include, for example, multiple wireless transceivers 721 and wireless antennas 722 to enable transmitting and/or receiving signals according to corresponding multiple wireless communication standards for Wide Area Networks (WAN), Wireless Local Area Networks (WLAN), Personal Area Networks (PAN), etc. Such as, for example, versions of IEEE Std. 802.11, CDMA, WCDMA, LTE, UMTS, GSM, AMPS, Zigbee, and Bluetooth, just to name a few examples.

Mobile device 700 may also comprise SPS receiver 755 capable of receiving and acquiring SPS signals 759 via SPS antenna 758. SPS receiver 755 may also process, in whole or in part, acquired SPS signals 759 for estimating a location of mobile device 700. In some embodiments, general-purpose processor(s) 711, memory 740, DSP(s) 712 and/or specialized processors (not shown) may also be utilized to process acquired SPS signals, in whole or in part, and/or calculate an estimated location of mobile device 700, in conjunction with SPS receiver 755. Storage of SPS or other signals for use in performing positioning operations may be performed in memory 740 or registers (not shown).

Figure 8:
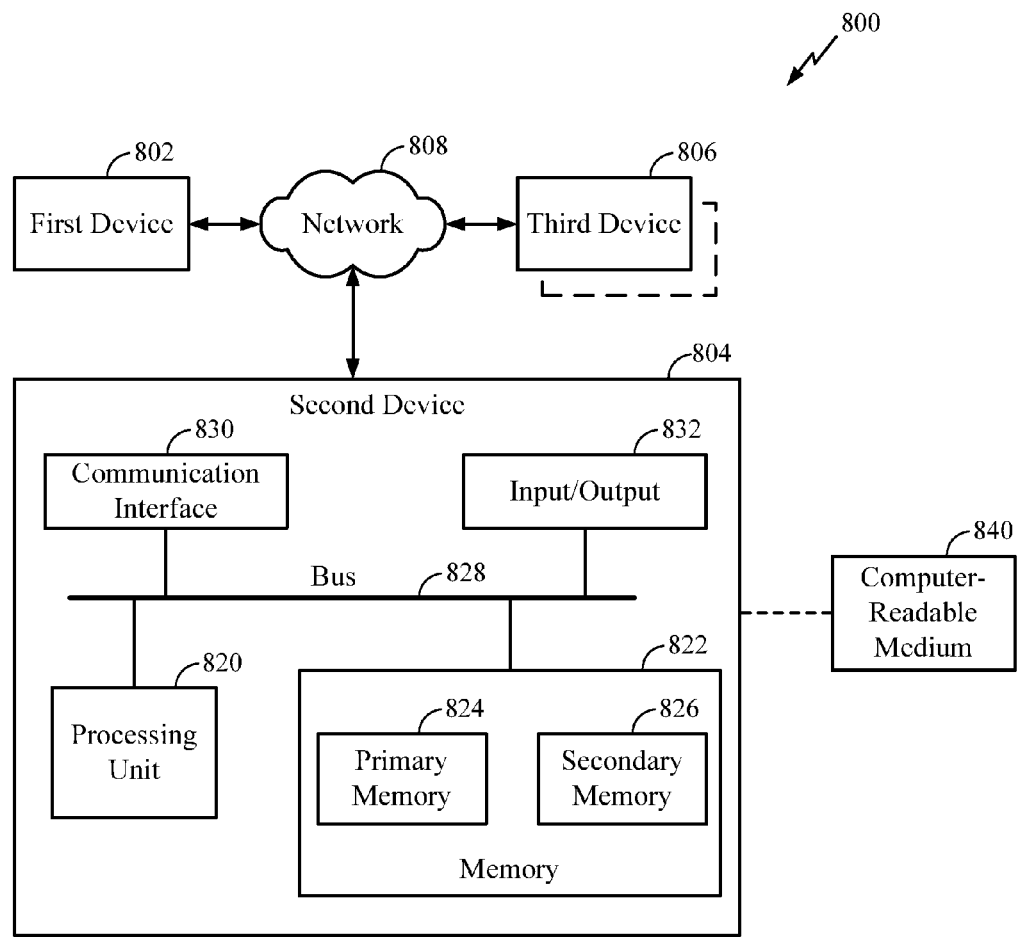
FIG. 8 is a schematic block diagram of an example computing platform in accordance with an embodiment.

Also shown in FIG. 8, mobile device 700 may comprise digital signal processor(s) (DSP(s)) 712 connected to the bus 701 by a bus interface. General-purpose processor(s) 711 may be connected to the bus 701 by way of a bus interface and memory 740. A bus interface may be integrated with the DSP(s) 712, general-purpose processor(s) 711 and memory 740. In various embodiments, functions may be performed in response execution of one or more machine-readable instructions stored in memory 740 such as on a computer-readable storage medium, such as RAM, ROM, FLASH, or disc drive, just to name a few example. The one or more instructions may be executable by general-purpose processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712 to perform functions described herein. Memory 740 may comprise a database for storing radio signal strength values of a radio heatmap comprising a list of discrete locations of an indoor area and corresponding values of expected and/or predicted received signal strength of electromagnetic signals transmitted from a wireless transmitter and received at the discrete locations.

Also shown in FIG. 7, a user interface 735 may comprise any one of several devices such as, for example, a speaker, microphone, display device, vibration device, keyboard, touch screen, just to name a few examples. In a particular implementation, user interface 735 may enable a user to interact with one or more applications hosted on mobile device 700. For example, devices of user interface 735 may store analog or digital signals on memory 740 to be further processed by DSP(s) 712 or general-purpose processor 711 in response to action from a user. Similarly, applications hosted on mobile device 700 may store analog or digital signals on memory 740 to present an output signal to a user. In implementations, a user may interact with user interface 735 to determine an estimated location of the mobile device. The estimated location may be determined by acquiring signals from one or more access points and comparing received signals with RSSI values from a radio heatmap. Responsive to transmission of probe request messages and receipt of probe response messages, for example, an estimated position within an indoor area may be rendered using video processor 768 for display on a display device.

In an implementation, mobile device 700 may include a dedicated audio input/output (I/O) device 770 comprising, for example, a dedicated speaker, microphone, digital to analog circuitry, analog to digital circuitry, amplifiers, and/or gain control. It should be understood, however, that this is merely an example of how an audio I/O may be implemented in a mobile device, and that claimed subject matter is not limited in this respect. In another implementation, mobile device 700 may comprise touch sensors 762 responsive to touching or pressure on a keyboard or touch screen device.

Mobile device 700 may also comprise a dedicated camera device 764 for capturing still or moving imagery. Camera device 764 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general-purpose/application processor 711 or DSP(s) 712. Alternatively, a dedicated video processor 768 may perform conditioning, encoding, compression, or manipulation of signals representing captured images. Additionally, video processor 768 may decode/decompress stored image data for presentation on a display device (not shown) on mobile device 700.

Mobile device 700 may also comprise sensors 760 coupled to bus 701, which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, camera imagers, microphones, just to name few examples. Sensors 760 may generate analog or digital signals that may be stored in memory 740 and processed by general-purpose application processor 711 in support of one or more applications such as, for example, applications directed to positioning or navigation operations.

In a particular implementation, mobile device 700 may comprise a dedicated modem processor 766 capable of performing baseband processing of signals received and downconverted at wireless transceiver 721 or SPS receiver 755. Similarly, modem processor 766 may perform baseband processing of signals to be upconverted for transmission by wireless transceiver 721. In alternative implementations, instead of comprising a dedicated modem processor, baseband processing may be performed by a general-purpose processor or DSP (e.g., general-purpose/application processor 711 or DSP(s) 712). It should be understood, however, that these are merely examples of structures that may perform baseband processing, and that claimed subject matter is not limited in this respect.

In a particular implementation, mobile device 700 may be capable of performing one or more of the actions set forth in the process of FIG. 7. For example, general-purpose application processor 711 may perform all or a portion of actions at blocks 505, 510, 515, 520, 525, 530, 535, 540, 545, 550, 620 and/or 630.

FIG. 8 is a schematic diagram illustrating an example system 800 that may include one or more devices configurable to implement techniques or processes described above, for example, in connection with FIGS. 4, 6, and 7. System 800 may include, for example, a first device 802, a second device 804, and a third device 806, which may be operatively coupled through a wireless communications network 808. In an aspect, first device 802 may comprise a server capable of providing network-based position estimation. In another aspect, a mobile device may estimate a location based on probe request and probe response messages. Second and third devices 804 and 806 may comprise mobile devices, in an aspect. In addition, in an aspect, wireless communications network 808 may comprise one or more cellular base stations and/or wireless access points, for example. However, claimed subject matter is not limited in scope in these respects.

First device 802, second device 804 and third device 806, as shown in FIG. 8, may be representative of any device, appliance or machine (e.g., such as wireless transceiver 115 or servers 140, 150, or 155 as shown in FIG. 1) that may be configurable to exchange data over wireless communications network 808. By way of example but not limitation, any of first device 802, second device 804, or third device 806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, or a wireless communication service provider/system; or any combination thereof. Any of the first, second, and third devices 802, 804, and 806, respectively, may comprise one or more of a base station almanac server, a base station, or a mobile device in accordance with the examples described herein.

Similarly, communications network 808 (e.g., in a particular of implementation of network 130 shown in FIG. 1), may be representative of one or more communication links, processes, or resources configurable to support the exchange of data between at least two of first device 802, second device 804, and third device 806. By way of example but not limitation, communications network 808 may include wireless or wired communication links, telephone or telecommunications systems, data buses or channels, optical fibers, terrestrial or space vehicle resources, local area networks, wide area networks, intranets, the Internet, routers or switches, and/or the like, or any combination thereof. As illustrated, for example, by the dashed lined box illustrated as being partially obscured of third device 806, there may be additional like devices operatively coupled to wireless communications network 808. Thus, by way of example but not limitation, second device 804 may include at least one processing unit 820 that is operatively coupled to a memory 822 through a bus 828. It is recognized that all or part of the various devices and networks shown in system 800, and the processes and methods as further described herein, may be implemented using or otherwise including hardware, firmware, or software, or any combination thereof.

Processing unit 820 is representative of one or more circuits configurable to perform at least a portion of a data computing procedure or process. By way of example but not limitation, processing unit 820 may include one or more processors, controllers, microprocessors, microcontrollers, application specific integrated circuits, digital signal processors, programmable logic devices, field programmable gate arrays, and/or the like, or any combination thereof.

Memory 822 is representative of any data storage mechanism. Memory 822 may include, for example, a primary memory 824 or a secondary memory 826. Primary memory 824 may include, for example, a random access memory, read only memory, etc. While illustrated in this example as being separate from processing unit 820, it should be understood that all or part of primary memory 824 may be provided within or otherwise co-located/coupled with processing unit 820.

In particular implementation, second device 804 may be capable of rendering an estimated location of a mobile device. For example, second device 804 may receive parameters in messages receiving from a client STA, receiving STA and/or sending STA through communication network 808 for use in forming expressions for use in computing an estimated location of the client STA. In certain implementations, a transceiver (not shown) of a second device 804 may transmit an estimated location of second device 804 to first device 802. Responsive to computing an estimated location by measuring received signal strengths, computing receiver gain, and utilizing computed receiver gain to adjust values indicated on a radio heatmap, first device 802 may transmit an estimated location of second device 804. Second device 804 may display one or more estimated positions by way of a display device (not shown) coupled to, for example bus 828. Secondary memory 826 may include, for example, the same or similar type of memory as primary memory or one or more data storage devices or systems, such as, for example, a disk drive, an optical disc drive, a tape drive, a solid state memory drive, etc. In certain implementations, secondary memory 826 may be operatively receptive of, or otherwise configurable to couple to, a computer-readable medium 840. Computer-readable medium 840 may include, for example, any non-transitory medium that can carry or make accessible data, code or instructions for one or more of the devices in system 800. Computer-readable medium 840 may also be referred to as a storage medium.

Second device 804 may include, for example, a communication interface 830 that provides for or otherwise supports the operative coupling of second device 804 to at least wireless communications network 808. By way of example but not limitation, communication interface 830 may include a network interface device or card, a modem, a router, a switch, a transceiver, and the like.

Second device 804 may include, for example, an input/output device 832. Input/output device 832 is representative of one or more devices or features that may be configurable to accept or otherwise introduce human or machine inputs, or one or more devices or features that may be configurable to deliver or otherwise provide for human or machine outputs. By way of example but not limitation, input/output device 832 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Memory 822 may represent any suitable or desired information storage medium. For example, memory 822 may include a primary memory 824 and a secondary memory 826. Primary memory 824 may include, for example, a random access memory, read only memory, etc. While illustrated in this example as being separate from a processing unit, it should be appreciated that all or part of primary memory 824 may be provided within or otherwise co-located/coupled with processing unit 820. Secondary memory 826 may include, for example, the same or similar type of memory as primary memory or one or more information storage devices or systems, such as, for example, a disk drive, an optical disc drive, a tape drive, a solid state memory drive, etc. In certain implementations, secondary memory 826 may be operatively receptive of, or otherwise enabled to be coupled to, a non-transitory computer-readable medium 840.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered a self-consistent sequence of operations or similar signal processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a mobile device, comprising:
   acquiring multiple beacon signals, wherein each of said multiple acquired beacon signals is identified by identifiers encoded into said each of said multiple acquired beacon signals;
   inferring that two or more of said multiple acquired beacon signals originate from a single physical transceiver based, at least in part, on said identifiers;
   confirming, responsive to said inferring, that said two or more of said multiple acquired beacon signals originate from said single physical transceiver based, at least in part, on measurement of carrier signal characteristics of said multiple acquired beacon signals;
   transmitting, to a server, one or more reports of virtual access points that correspond to said single physical transceiver; and
   prioritizing, responsive to said confirming that said two or more of said multiple acquired beacon signals originate from said single physical transceiver, scanning one or more communication channels utilized by a first virtual access point in relation to scanning one or more communication channels utilized by a second virtual access point, said first and said second virtual access points being collocated with said single physical transceiver.

2. The method of claim 1, wherein said inferring comprises:
   recognizing a similarity between or among unique identifiers.

3. The method of claim 2, wherein said similarity between or among said identifiers comprises said identifiers differing by no more than two hexadecimal characters.

4. The method of claim 1, wherein confirming that said two or more of said multiple acquired beacon signals originate from said single physical transceiver comprises:
   obtaining signal measurements to determine said carrier signal characteristics of said two or more of said multiple acquired beacon signals; and
   correlating said two or more of said multiple acquired beacon signals based, at least in part, on a similarity of said obtained signal measurements.

5. The method of claim 4, wherein correlating said two or more of said multiple acquired beacon signals comprises correlating received signal strength among said two or more of said multiple acquired beacon signals.

6. The method of claim 5, wherein said correlating said received signal strength of said two or more of said multiple acquired beacon signals comprises:
   measuring signal strength of said two or more of said multiple acquired beacon signals at two or more locations;
   recognizing that a signal strength of one of said two or more of said multiple acquired beacon signals differs approximately by a constant between said two or more locations; and
   recognizing that a signal strength of another of said two or more of said multiple acquired beacon signals also differs approximately by said constant between said two or more locations.

7. The method of claim 4, wherein correlating said two or more of said multiple acquired beacon signals comprises correlating round-trip time measurements between or among said two or more of said multiple acquired beacon signals.

8. The method of claim 1, wherein said mobile device performs the inferring and the confirming, the method further comprising:
   said mobile device compiling one or more reports of virtual access points that correspond to said single physical transceiver.

9. The method of claim 8, wherein said one or more reports comprises a list of attributes of virtual access points, said list including two or more virtual access points associated with said two or more of said multiple acquired beacon signals confirmed to originate from said single physical transceiver, said attributes comprising an indication that a virtual access point may be accessed for RTT measurements with acceptable reliability, an indication that a virtual access point provides password protection, authentication, secure access, or relatively high-speed communications, or any combination thereof.

10. The method of claim 1, wherein said identifiers encoded in said two or more of said multiple acquired beacon signals represent baseband characters, and wherein said carrier signal characteristics correspond to characteristics of modulated carrier signals.

11. A mobile device comprising:
    a transceiver to acquire beacon signals from a communications channel, wherein unique identifiers are encoded in said acquired beacon signals and transmit messages; and
    one or more processors coupled to said transceiver, said one or more processors executing instructions to:

compute an inference that said acquired beacon signals emanate from a single physical transceiver based, at least in part, on said unique identifiers encoded in said acquired beacon signals;

confirm, responsive to computing said inference, that said acquired beacon signals originate from said single physical transceiver based, at least in part, on measurements of carrier signal characteristics of said acquired beacon signals;

initiate transmission, through said transceiver to a server, one or more reports of virtual access points that correspond to said single physical transceiver; and prioritize, responsive to said confirmation that two or more of said acquired beacon signals originate from said single physical transceiver, scan one or more communication channels utilized by a first virtual access point in relation to a scan of one or more communication channels utilized by a second virtual access point, said first and said second virtual access points to be collocated with said single physical transceiver.

12. The mobile device of claim 11, wherein said one or more processors execute instructions to:

recognize a similarity among said unique identifiers encoded in two or more of said acquired beacon signals, said similarity comprising said unique identifiers having a difference of no more than two hexadecimal characters.

13. The mobile device of claim 12, wherein said one or more processors execute instructions to:

compile one or more reports of virtual access points that correspond to said single physical transceiver.

14. The mobile device of claim 11, wherein said one or more processors execute instructions to:

obtain measurements of said carrier signal characteristics of two or more of said acquired beacon signals; and correlate said two or more of said acquired beacon signals based, at least in part, on a similarity among said obtained measurements of said carrier signal characteristics.

15. The mobile device of claim 11, wherein said one or more processors execute instructions to:

correlate two or more of said acquired beacon signals based, at least in part, on a similarity in received signal strength among said two or more of said acquired beacon signals.

16. The mobile device of claim 11, wherein said one or more processors execute instructions to:

correlate two or more of said acquired beacon signals based, at least in part, on similarity of round-trip time measurements among said two or more of said acquired beacon signals.

17. An article comprising:

a non-transitory machine-readable storage medium storing one or more programs for execution by one or more processors of a mobile device, said one or more programs comprising instructions to:

obtain beacon signals, acquired at a receiver, each of said acquired beacon signals being identified by a unique identifier encoded into said each of said acquired beacon signals;

compute an inference that two or more of said acquired beacon signals originate from a single physical transceiver based, at least in part, on said unique identifiers encoded into each of said two or more of said acquired beacon signals;

confirm, in response to computing said inference, that said two or more of said acquired beacon signals originate from said single physical transceiver based, at least in part, on a measurement of carrier signal characteristics of said two or more of said acquired beacon signals;

initiate transmission, to a server, of one or more reports of virtual access points that correspond to said single physical transceiver; and prioritize, responsive to said confirmation that said two or more of said acquired beacon signals originate from said single physical transceiver, scan one or more communication channels utilized by a first virtual access point in relation to said scan of said one or more communication channels utilized by a second virtual access point, said first and said second virtual access points to be collocated with said single physical transceiver.

18. The article of claim 17, wherein said instructions to confirm that said two or more of said acquired beacon signals originate from said single physical transceiver comprise instructions to:

obtain signal measurements of said two or more of said acquired beacon signals; and correlate said two or more of said acquired beacon signals based, at least in part, on a similarity in received signal strength, or similarity of round-trip time measurements, or a combination thereof.

19. The article of claim 17, said one or more programs further comprising instructions to:

compile one or more reports of virtual access points that correspond to said single physical transceiver.

20. The article of claim 17, wherein the instructions to compute and the instructions to confirm are both performed by said mobile device.

21. A mobile device, comprising:

means for acquiring beacon signals, each of said acquired beacon signals being identified by different corresponding unique identifiers encoded into said each of said acquired beacon signals;

means for inferring that two or more of said acquired beacon signals originate from a single physical transceiver based, at least in part, on said unique identifiers encoded into each of said two or more of said acquired beacon signals;

means for confirming, responsive to said means for inferring, that said two or more of said acquired beacon signals originate from said single physical transceiver based, at least in part, on measurement of carrier signal characteristics of said two or more acquired beacon signals;

means for transmitting, to a server, one or more reports of virtual access points that correspond to said single physical transceiver; and means for prioritizing a first virtual access point relative to a second virtual access point based, at least in part, on attributes of said first and second virtual access points, said attributes comprising an indication that a virtual access point may be accessed for RTT measurements with acceptable reliability, an indication that a virtual access point provides password protection, authentication, secure access, relatively high-speed communications, or any combination thereof.

22. The mobile device of claim 21, wherein said means for inferring that two or more of said acquired beacon signals originate from said single physical transceiver comprises:

means for recognizing a similarity between said unique identifiers encoded into said two or more of said acquired beacon signals.

23. The mobile device of claim 22, wherein said means for recognizing said similarity comprises means for recognizing a difference of no more than two hexadecimal characters between said unique identifiers encoded into said two or more of said acquired beacon signals.

24. The mobile device of claim 21, further comprising means for confirming that said two or more of said acquired beacon signals originate from said single physical transceiver based, at least in part, on measurement of carrier signal characteristics of said two or more of said acquired beacon signals, said means for confirming that said two or more of said acquired beacon signals originate from said single physical transceiver comprising:
   means for obtaining signal measurements of said two or more of said acquired beacon signals; and
   means for correlating said two or more of said acquired beacon signals based, at least in part, on a similarity of said obtained signal measurements.

25. The mobile device of claim 24, wherein said means for correlating said two or more of said acquired beacon signals comprises:
   means for correlating round-trip time measurements among said two or more of said acquired beacon signals.

26. The mobile device of claim 21, further comprising:
means for compiling a report of virtual access points inferred to correspond to said single physical transceiver.

* * * * *